Figure 1:
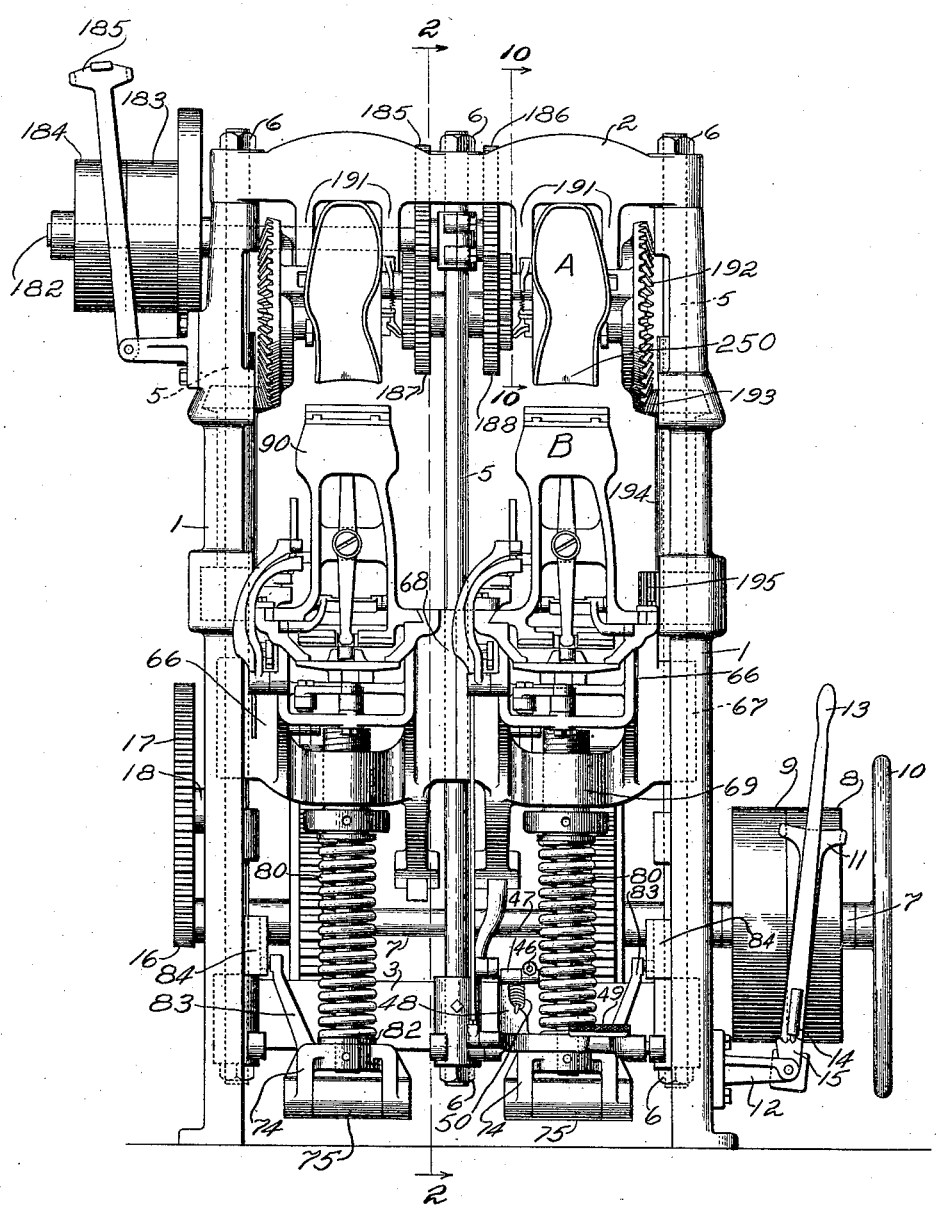

T. G. PLANT.
LAYING AND LEVELING MACHINE.
APPLICATION FILED SEPT. 21, 1908.

1,041,668.

Patented Oct. 15, 1912.
10 SHEETS—SHEET 1.

WITNESSES:
Roswell F. Hatch.
Amelia M. Ross

INVENTOR.
THOMAS G PLANT,
BY Robt P Hains,
ATTY.

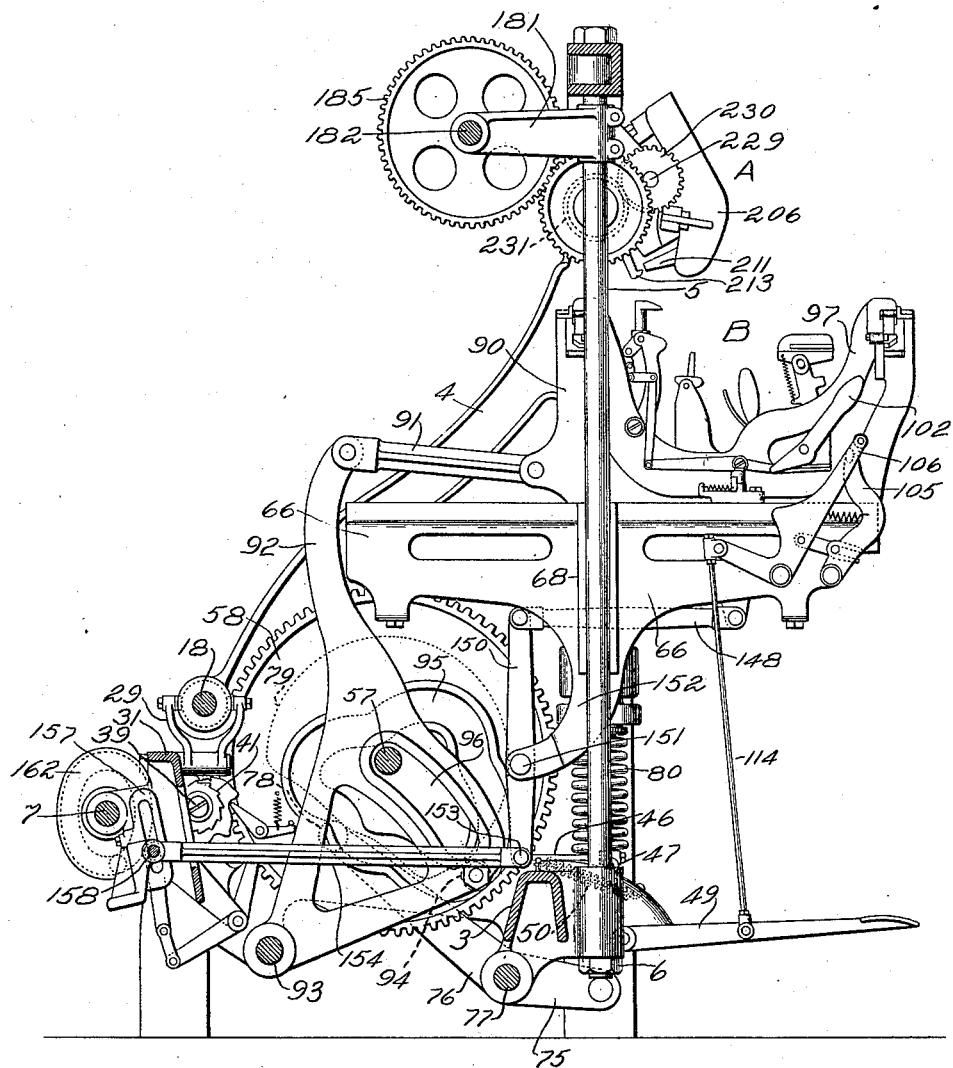

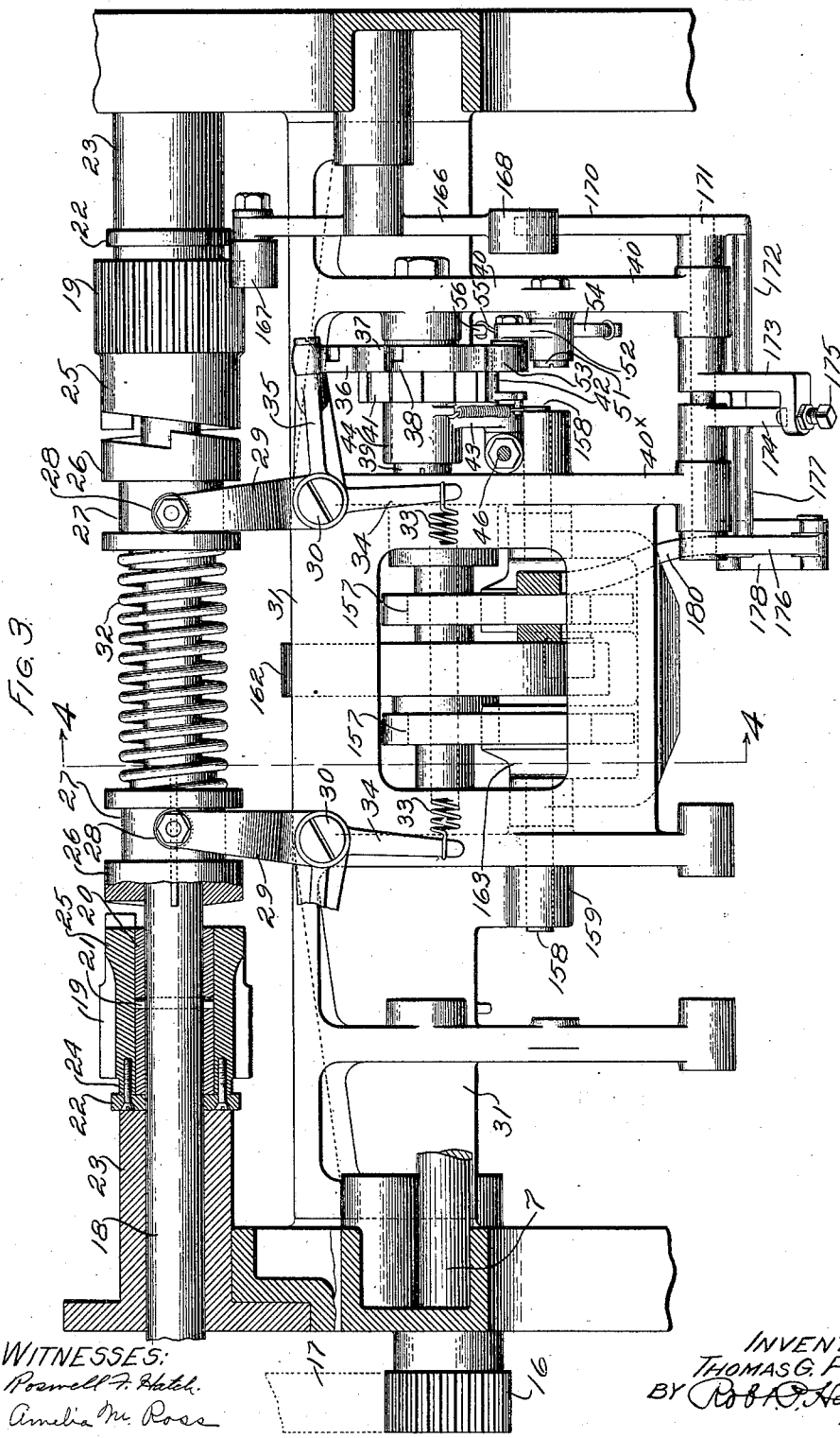

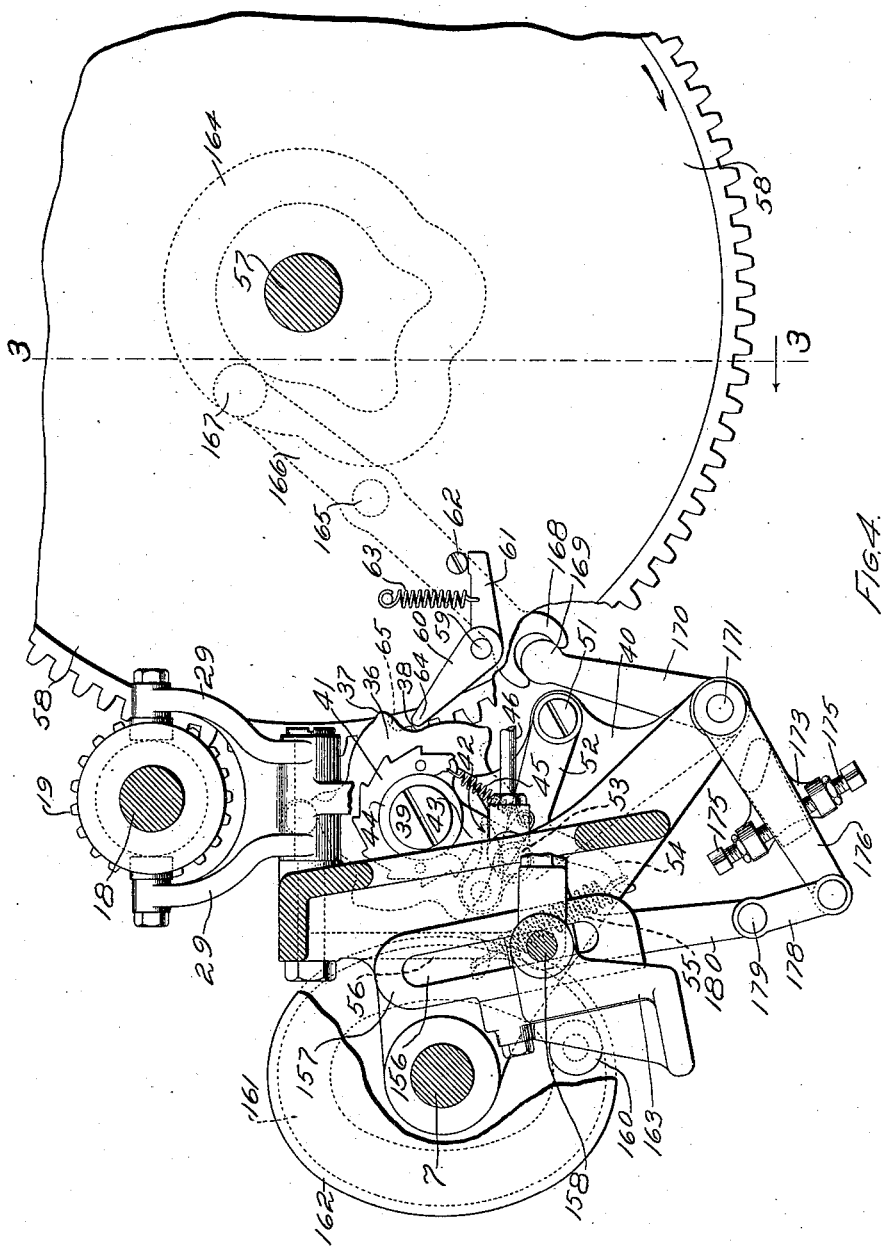

T. G. PLANT.
LAYING AND LEVELING MACHINE.
APPLICATION FILED SEPT. 21, 1908.
1,041,668.
Patented Oct. 15, 1912.
10 SHEETS—SHEET 5.
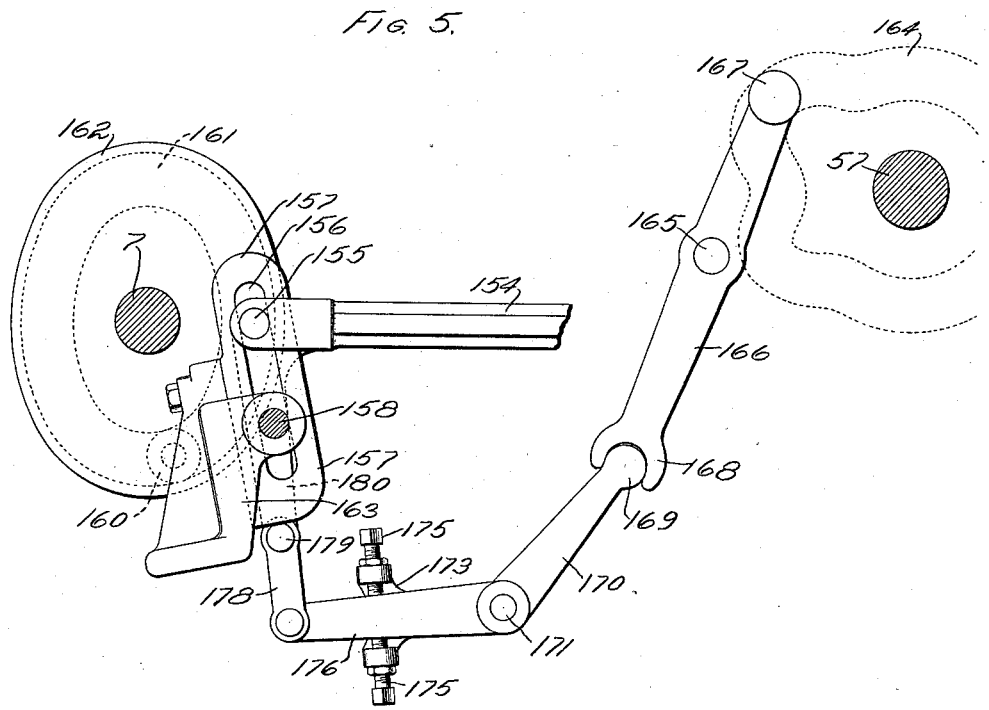
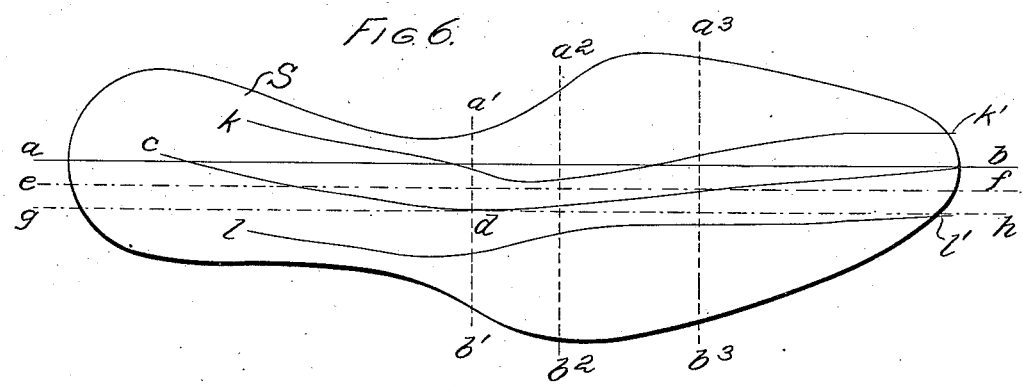
WITNESSES:
Roswell F. Hatch
Amelia M. Ross
INVENTOR
THOMAS G. PLANT
BY Robt P. Harris
ATTY.

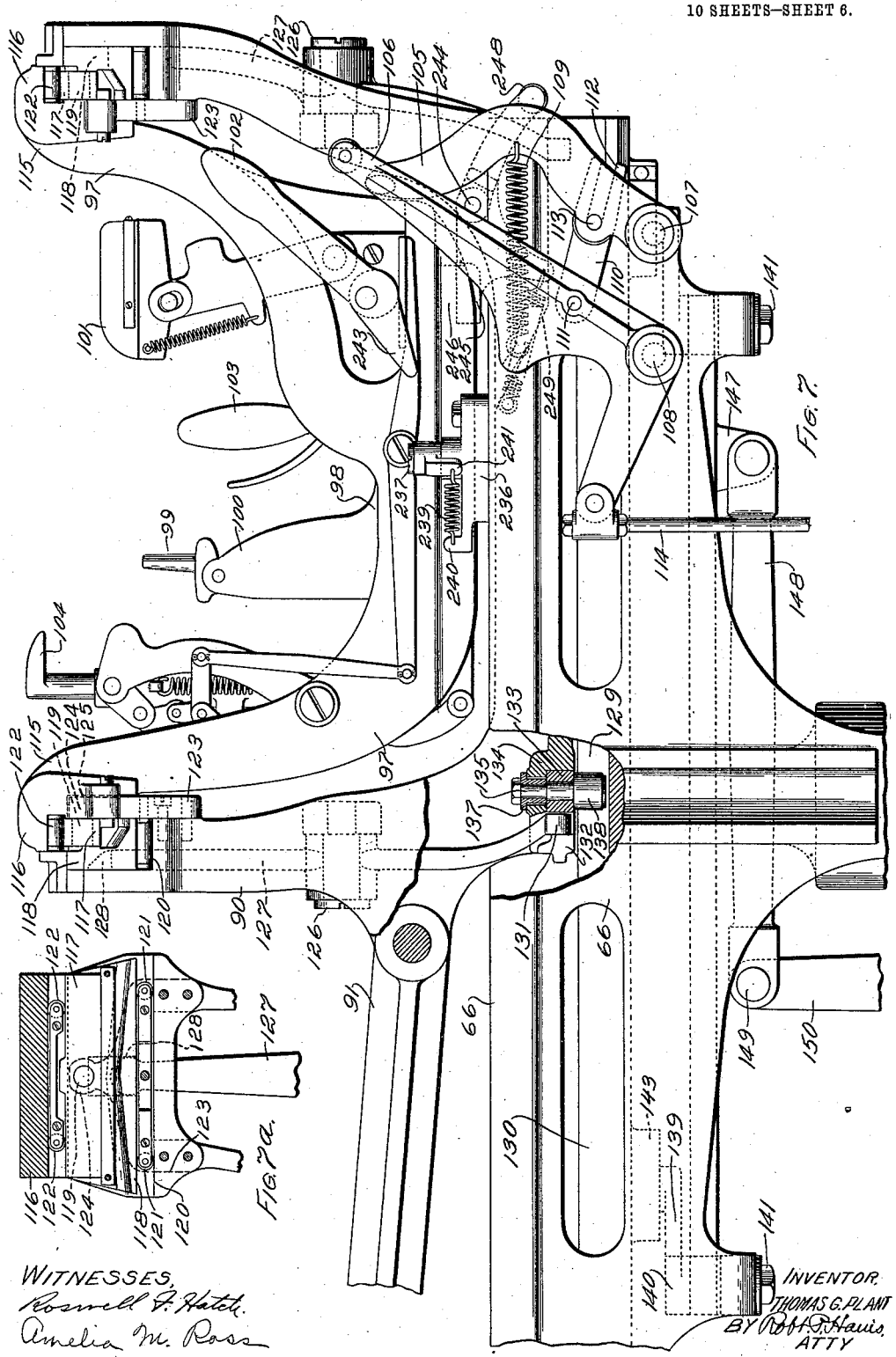

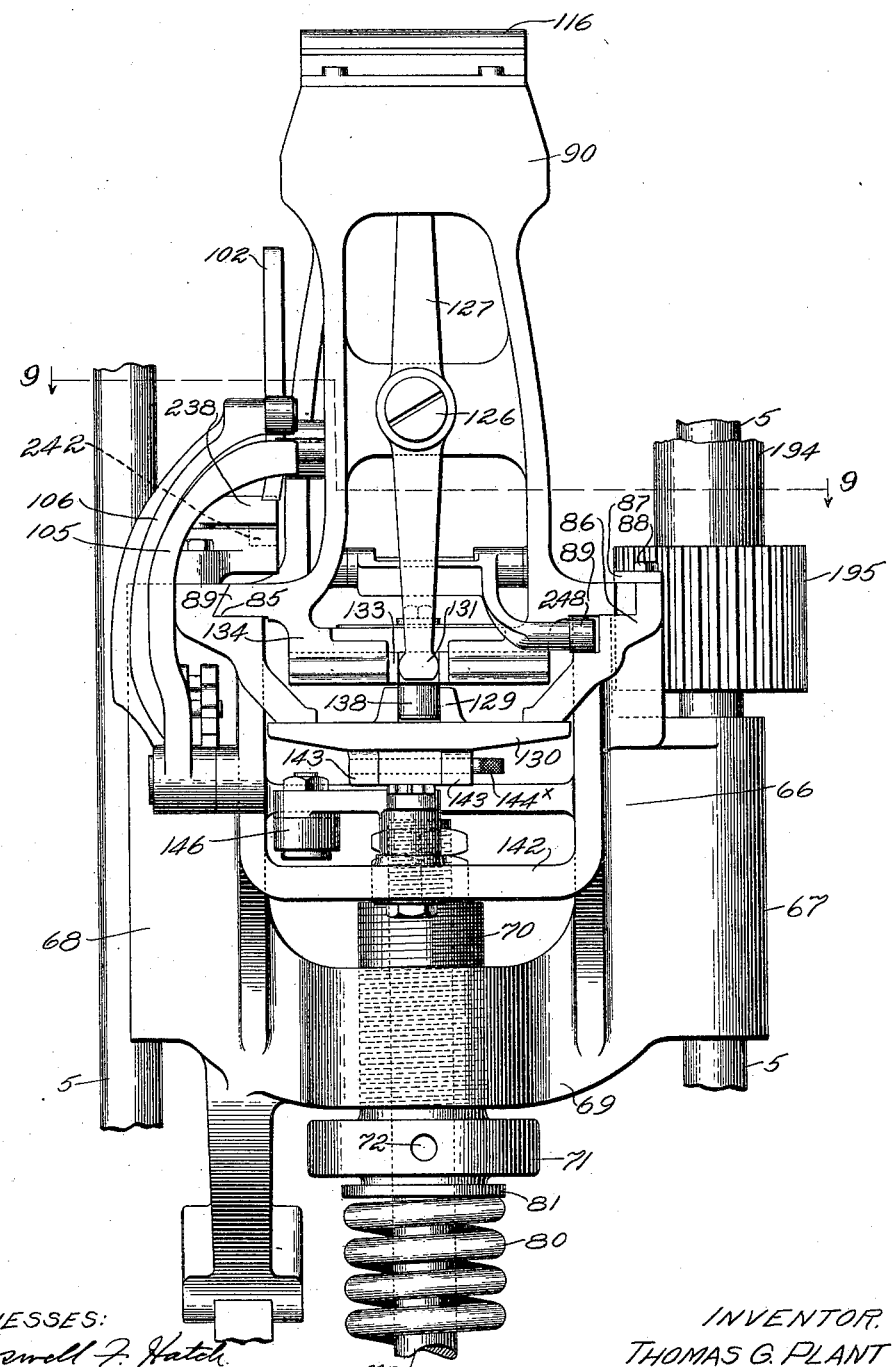

T. G. PLANT.
LAYING AND LEVELING MACHINE.
APPLICATION FILED SEPT. 21, 1908.
1,041,668.
Patented Oct. 15, 1912.
10 SHEETS—SHEET 8.
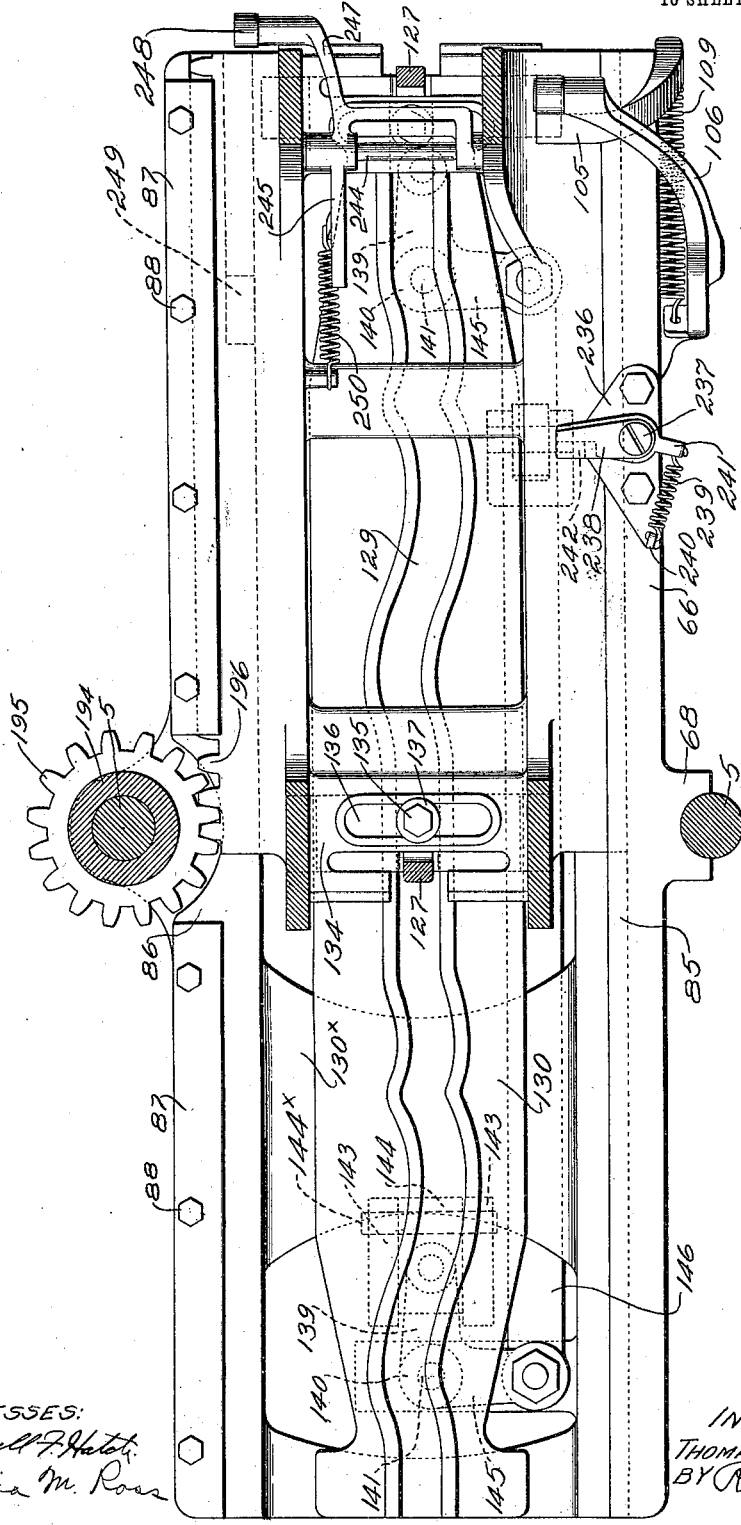

T. G. PLANT.
LAYING AND LEVELING MACHINE.
APPLICATION FILED SEPT. 21, 1908.

1,041,668.

Patented Oct. 15, 1912.

10 SHEETS—SHEET 9.

WITNESSES:
Roswell F. Hatch.
Amelia M. Ross

INVENTOR.
THOMAS G. PLANT
BY Robt. P. Hains,
ATTY.

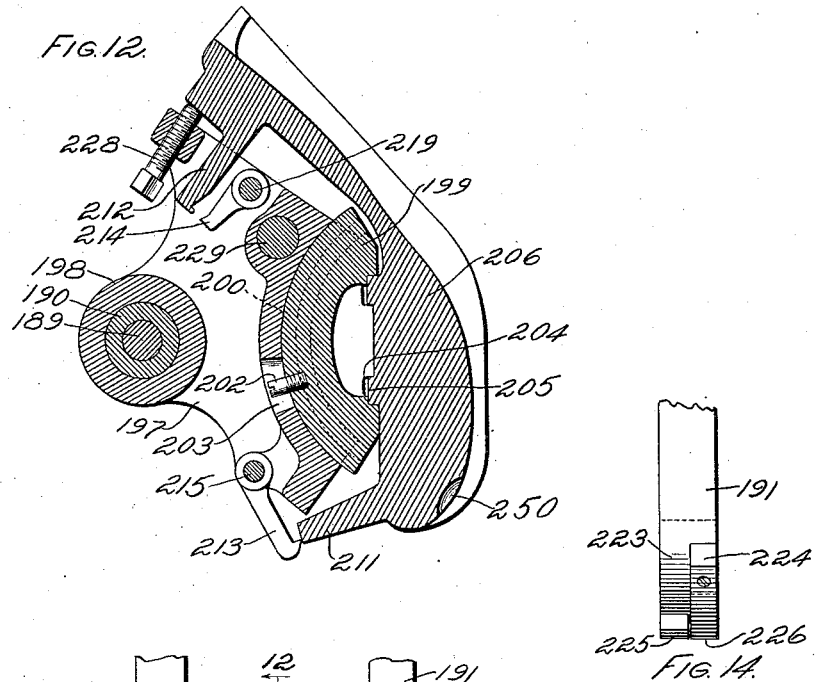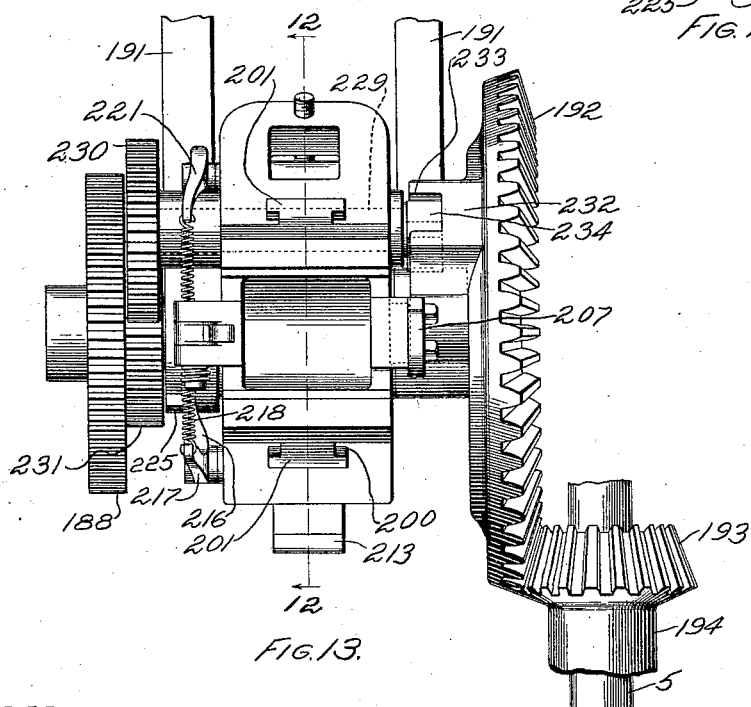

UNITED STATES PATENT OFFICE.

THOMAS G. PLANT, OF BOSTON, MASSACHUSETTS, ASSIGNOR TO UNITED SHOE MACHINERY COMPANY, OF PATERSON, NEW JERSEY, A CORPORATION OF NEW JERSEY.

LAYING AND LEVELING MACHINE.

1,041,668.  Specification of Letters Patent.   Patented Oct. 15, 1912.

Application filed September 21, 1908. Serial No. 454,082.

*To all whom it may concern:*

Be it known that I, THOMAS G. PLANT, a citizen of the United States, residing at Boston, in the county of Suffolk and State of Massachusetts, have invented an Improvement in Laying and Leveling Machines, of which the following description, in connection with the accompanying drawings, is a specification, like letters on the drawings representing like parts.

The invention to be hereinafter described relates to machines for acting on the soles of boots and shoes, and more particularly to machines of this general class known as sole-laying and sole-leveling machines.

As well known by those familiar with the art these machines have been generally recognized as (1) direct pressure machines, (2) oscillating jack and former machines, or (3) roll machines, according to the characteristic action thereof. Various attempts have been made to improve each of these types to secure a proper laying or leveling of the shoe sole. For instance, in the direct pressure type in which the sole is simultaneously subjected to pressure over its entire surface between a suitably shaped form and a jack or shoe support, the desirable laying operation has been sought by bringing the jack and form into a position of pressure and holding them in such position for periods of time and then without further treatment moving the jack into a position for the shoe to be removed. In the oscillating jack and former type, it has also been proposed to impart a relative longitudinal oscillation between the former and jack, and in other cases a transverse or lateral rock or oscillation to the former or jack about its pivotal supports in an endeavor to secure a proper laying or leveling action over the entire shoe sole. In the roll type of machine, attempts have been made to secure the desired results by rocking the roll or jack laterally to one side or the other, and giving to the roll varying pressures at different parts of the shoe sole.

The present invention differs from all of the above types of machines and their stated attempts at improvement, and aims to provide means which will properly and efficiently lay or level shoe soles in a manner more nearly approximating the well known hand operation, and wherein the desired laying or leveling action of a former may be properly applied to the shoe sole at various points thereof both longitudinally and transversely, all of which will hereinafter more fully appear in connection with the accompanying drawings of one mechanical embodiment of the invention, it being understood that changes and variations may be made within the true scope of the actual invention which is definitely pointed out in the claims.

Figure 10:
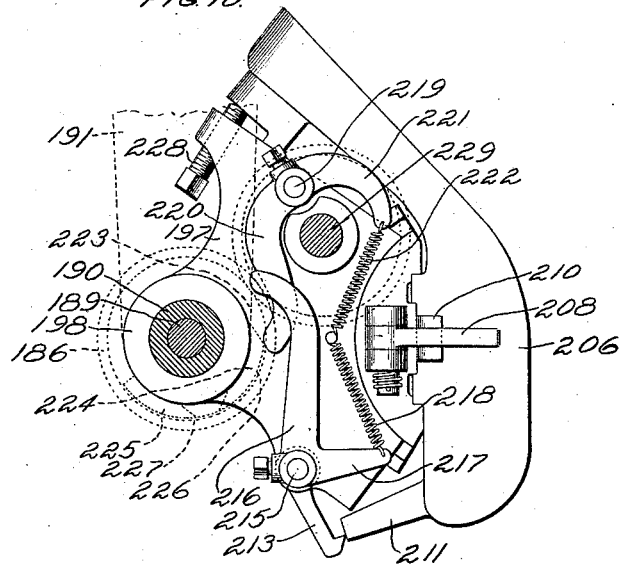
Figure 11:
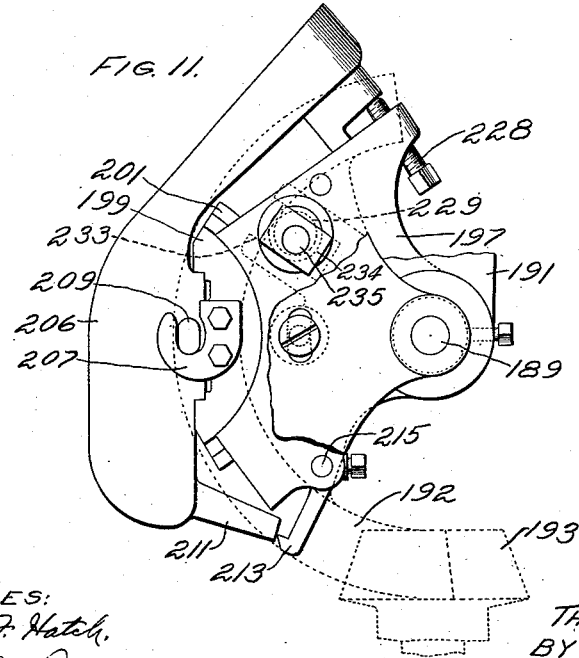

In the drawings: Figure 1 is a front view of a machine embodying the present invention, the parts being shown as arranged for a twin machine; Fig. 2 is a sectional elevation on the line 2—2, Fig. 1; Fig. 3 is a sectional elevation of details at the rear of the machine on line 3—3, Fig. 4, with the gear cam omitted; Fig. 4 is a detail section on line 4—4, Fig. 3, with the rocking frame in elevation; Fig. 5 is a view similar to Fig. 4 showing the parts in another position and omitting other parts for clearness of illustration; Fig. 6 is a diagrammatic view of a shoe sole indicating the swing thereof, its central line, the varying lines of support of the shoe as it is being treated, and the pressure vibrations distributed on opposite sides of said line; Fig. 7 is an enlarged detail showing one form of jack, its support or slide, the table, and associated parts; Fig. 7ª is a detail end view of the sliding supports for the cradle; Fig. 8 is a front view of the parts shown in Fig. 7 showing also the spring support for the table; Fig. 9 is an enlarged sectional view on the line 9—9 of Fig. 8; Fig. 10 is an enlarged sectional detail on line 10—10 of Fig. 1, with the supporting frame omitted; Fig. 11 is a side view of the former and associated parts looking in a direction opposite that in Fig. 10; Fig. 12 is a section on line 12—12, Fig. 13, showing the former and its connection with its carrier; Fig. 13 is a detached detail on an enlarged scale of the former carrier and connected parts; and Fig. 14 is a detail of the cams for actuating the catch fingers at the heel and toe ends of the former.

The machine frame, which may be of any desired character, is shown in the present instance as formed of the side uprights 1, upper and lower cross beams 2 and 3, and rearwardly extending braces 4, which, at their lower portion may be joined to the lower cross beam 3, Figs. 1 and 2. Extending between the cross beams 2 and 3 are the tie rods 5, 5, preferably, though not necessarily, three in number, the central one dividing the frame into two substantially similar portions to provide a twin machine frame, said tie rods being connected to the cross beams 2 and 3 respectively by the screw nuts 6, 6, and affording guides for the jack or shoe supporting table in its rising and lowering movements, as will more fully appear hereinafter.

Mounted in suitable bearings in the main supporting frame is the driving shaft 7 provided with the usual fast and loose pulleys 8 and 9 adapted to be driven by a belt (not shown) from any usual source of power, and a hand wheel 10 by which the driving shaft may be manually turned when the driving belt is connected to the loose pulley. A belt shipper 11, pivoted to a bracket 12 and provided with an operating handle 13, Fig. 1, serves to shift the belt from the fast to the loose pulley and vice versa, and a catch 14 on the handle by engagement with notches on a plate 15 holds the handle and belt shifter in position of adjustment.

The driving shaft 7 extends to the opposite side of the frame and is there provided with a gear 16, Figs. 1 and 3, which meshes with a larger gear 17 secured to a shaft 18 extending across the machine frame, and which, for identification, will be termed the clutch shaft. Thus it will be seen that the driving and clutch shafts are operated continuously when the belt is on the fast pulley.

Loosely mounted on the clutch shaft 18 are the two similar gears 19, 19, each of said gears being held from longitudinal movement thereon by means of a sleeve or bushing 20 secured to the shaft by a pin 21 and engaging a collar 22 between itself and a bearing 23, said collar being secured to the gear 19 by suitable screws 24, Fig. 3. Obviously, other expedients for loosely mounting these gears 19 on the clutch shaft 18 may be employed.

Each of the gears 19, Fig. 3, has an extended hub 25, the face of which constitutes one member of a clutch, the other member being formed by a part 26 splined to the shaft 18, and having a circular recess 27 engaged by a roller 28 carried by an arm of a bell crank lever 29 pivoted at 30 to a bracket or tie beam 31 extending between the lower ends of the braces 4 constituting part of the main frame. A spring 32 disposed between the clutch members 26, 26, normally tends to move them into engagement with their coöperating clutch members 25, 25 when they are free to move, as will later appear.

Each of the bell cranks 29 has a tail piece 34 to which a spring 33 is connected, said spring tending to hold the arm 35 of the bell crank against the periphery of a clutch controller 36, Figs. 3 and 4, provided with raised and depressed portions 37 and 38, respectively. Obviously, when the end 35 of the bell crank rests upon a raised portion 37, the clutch member 26 is out of engagement with its coöperating member 25, and when the end 35 moves into a depression 38, the spring 32 is permitted to move the clutch members into engagement. If at this time the high parts of the clutch faces are opposed to each other, obviously, the member 26 cannot move longitudinally of the shaft until it has been rotated to carry the high parts of the clutch members out of face engagement. The bell crank 29, however, is turned by the spring 33 to maintain the end 35 of the bell crank on the clutch controller, and such turning movement is permitted by making the circular recess 27 of increased width as shown.

As hereinbefore stated, the drawings show a duplicate or twin machine arrangement, so that an operator may be removing or placing a shoe with respect to one machine while the other is acting upon a shoe to lay or level the sole, but these two machines, while mounted on the same frame work, are independent and one may be operated without operating the other. They are, in effect, two like machines mounted side-by-side, each independently controlled and operated, and a description of one will be sufficient.

The clutch controller 36 is mounted upon a stud 39 secured to a bracket or arm 40 projecting from the cross beam 31, and has formed as part of said controller 36, or secured rigidly thereto, a ratchet wheel 41, which is actuated by a pawl 42 carried by an arm 43 projecting from a hub 44 mounted on the stud 39, a spring 45 normally acting to hold the pawl in engagement with the teeth of the ratchet, as clearly indicated in Figs. 3 and 4. Jointed to the pawl arm 43 is a rod 46, which leads to the front of the machine where it is jointed, as at 47, to an arm 48 rising from the treadle 49, Figs. 1 and 2. A spring, as 50, normally holds the treadle raised and the said rod 46 pushed rearward, the pawl 42 at such time being in engagement with the teeth of the ratchet 41 and in position to turn the same the desired distance when the treadle is depressed.

Pivotally mounted at 51 on the bracket or arm 40, Figs. 3 and 4, is a yielding locking arm 52 carrying a roller 53 adapted to engage the depressions in the clutch controller 36 and lock the same from rotation in either direction, but yet permit the ratchet 41 to turn the controller when actuated by the treadle, as already described. To cause this yielding lock action, the arm 52 has a projecting lug 54 which is engaged by one end of a spring 55, the opposite end of said spring being secured to an arm 56 projecting from the cross beam 31.

From the construction thus far described, it will be apparent that upon depression of the treadle 49, the pawl 42 will rotate the ratchet 41 and turn the clutch controller a suitable distance to cause its raised and depressed periphery to act upon the arm 35 of the bell crank, so that, assuming the arm 35 to be resting on a raised portion of the clutch controller 36, in which position the clutch members are disengaged, and the treadle to be depressed, then the clutch controller will be moved to permit the end of the arm 35 to drop into a depressed portion of the controller, whereupon the clutch members become engaged and the gear 19 rotated. The above is a good and practical form of stopping and starting device, but it is to be understood that the invention is not restricted thereto.

Mounted on a shaft 57, Figs. 2, 4 and 5, is a cam faced gear 58 meshing with the smaller gear 19 on the clutch shaft so that when the gear 19 is rotated, as hereinbefore explained, it imparts rotation to the cam gear 58 from which some of the characteristic motions of the parts during the laying and leveling operations are derived, as will presently appear. It is sufficient at this time to state that when the cam gear 58 has made one complete rotation from a point somewhat in advance of that indicated in Fig. 4, one full cycle of the machine operation has been made, and it is desirable to bring the parts to rest automatically. To secure this automatic stopping of the machine, the cam gear 58 has pivotally mounted thereon, at 59, a trip finger 60 having a tail piece 61 normally held against a stop pin 62, on the face of the gear, by a spring 63, Fig. 4, the end 64 of the trip finger at such times projecting so as to engage a recess 65 in the periphery of the clutch controller 36. From this it will be clear that as the cam gear 58 completes its rotation under the actuation of the gear 19, the end 64 of the stop finger will engage a recess 65 and turn the clutch controller to cause a high part 37 thereof to pass beneath the end of the arm 35 of the bell crank and disengage the clutch members 25 and 26, thus stopping the machine.

Mounted near the top of the machine frame is the former and its actuating devices identified, as a whole, in Figs. 1 and 2, by A, said former being provided with a patterned surface generally complemental to the surface of the shoe sole to be treated, and opposed thereto is the co-acting shoe support, generally designated by B, said former and shoe support being adapted for certain relative movements to effect the proper laying and leveling of a shoe sole, all of which will now be explained.

Guided for rising and lowering movements in the machine frame is the table 66, said table preferably having extended side bearings sliding on and guided by the tie rods 5. In the present form of the invention one side of the table 66 has an extended sleeve bearing 67, Figs. 1 and 8, embracing the tie rod 5 at the side of the frame, and the other side has an extended half sleeve 68, Figs. 1, 2 and 8, embracing the middle tie rod 5, the construction being such that the middle tie rod 5 serves as a guide for the inner side of each table in a twin machine structure. The table 66 is provided with a lower yoke portion 69 preferably, though not necessarily, cast or formed integral with the sleeve bearings 67 and 68 to give rigidity to the table as a whole, and screw threaded into this yoke is an adjusting sleeve 70 having a capstan head 71 provided with holes 72 by which it may be turned. Passing loosely through the adjusting sleeve 70 is a rod 73 supported at its lower end in a suitable manner, as by the pivoted yoke 74, upon the end 75 of a lever 76 pivoted or fulcrumed at 77 upon the cross beam 3 or other stationary part, the other end of said lever 76 being provided with a roll 78 riding on a cam 79 carried by the cam gear 58, so that upon rotation of the cam gear, as hereinbefore described, the lever 76 will be rocked upon its fulcrum in a manner dependent upon the shape of the cam 79. The upper end of the rod 73 above the adjusting sleeve 70 is screw threaded to receive suitable nuts, as shown, Fig. 8, which rest upon the upper surface of the sleeve 70. Surrounding the rod 73 is a spring 80, the upper end of which is seated against a washer 81 at the under side of the capstan, and the lower end of which is seated upon a washer 82 supported by the yoke 74. An arm 83 preferably extends from the yoke 74 and engages a guide 84 secured to the side frame. From the above construction it will be clear that rotation of the cam gear 58 will cause the lever 76 to be actuated and, through the spring 80, raise or lower the table 66 to cause the table and shoe supported thereon to be moved toward and from the former, in a manner and for the purpose hereinafter described.

The table 66 is adapted to support a suitable jack, such, for instance, as set forth in Patents Nos. 958,301 and 958,278, both dated May 17, 1910, and in the present application of the invention the jack of Patent No. 958,301 has been shown, it being clearly understood, however, that the invention is not restricted thereto.

To provide for sliding the jack or shoe support upon the table 66, the latter is provided with suitable ways 85 and 86 to receive the slide portions 89 of the jack carrier 90, one of said ways being preferably formed, in part at least, by a cap piece 87 secured to the table by nuts and bolts 88 or the like, Figs. 8 and 9, in order that the parts may be readily assembled or disassociated. Connected to the jack carrier 90 is a link 91, Fig. 2, jointed to an actuator 92 pivoted at 93 to the machine frame, and having a stud or roll 94 traveling in the cam groove 95 of the cam gear 58, whereby upon rotation of the cam gear, as hereinbefore described, the said actuator will move the jack carrier 90 longitudinally of the table 66 in a manner to properly bring each portion of the shoe sole in proper position longitudinally for treatment by the former, as will presently appear. The actuator 92 is provided with a slot 96 to embrace the shaft 57, as indicated.

As well known by those skilled in the art, the sole of a shoe is usually not straight from heel to toe, that is, the sole has a "swing", as it is termed, and a straight line drawn from the center of the heel to the center of the toe would not pass through the center of the sole at points intermediate the heel and toe, so that the distance of the opposite edges of the sole from said line at points between the heel and toe would not be equal. Under such conditions if a shoe be jacked and supported on a line of support passing through the center of the heel and toe, and a former be moved progressively over the shoe sole, and pressure between the former and shoe sole be maintained during such progressive movement, it is evident that the edge nearer the said center line would be subjected to greater pressure than the edge more remote therefrom.

For instance, referring to Fig. 6, if the shoe S be supported on a line of support $a$—$b$, passing through the center of the heel and toe, and relative progression be produced between a former and said sole, it is evident that the laying or leveling action of the former or its pressure on opposite sides of the line of support $a$—$b$ will be unequal, being greater between said line and the points $a'$, $a^2$, $a^3$, for instance, than between said line $a$—$b$ and the corresponding points $b'$, $b^2$, $b^3$ on the opposite side owing to the difference in leverage or surface of pressure distribution. In order to have the laying and leveling action or pressure equally distributed and applied from one edge of the sole to the other at any point between the heel and toe, it will be necessary to apply such action or pressure along a line situated midway or centrally of the sole at all points between the heel and toe, as, for instance, along the line $c$, $d$, $b$. On the other hand, should it be desired to apply the said action or pressure with greater efficiency toward one edge than the other at any point in the length of the sole, it would be necessary to exert said action or pressure along a line nearer to the edge where the greater action or pressure is desired. In other words, the degree of action or pressure will be greater along that edge which is nearer the line of support of the shoe sole and relatively less toward the opposite edge. It follows, therefore, that by proper alteration or shifting of the line of shoe support, the laying and leveling action or pressure may be correspondingly varied toward one or the other edge of the shoe sole as desired. As one of the important features of the invention, means are provided whereby the relative efficiency of the laying and leveling action or pressure upon the shoe sole toward one or the other edge thereof may be readily controlled and greater or less action or pressure be applied on either side as desired without at the same time varying the actual or total pressure between the former and sole. That is, while maintaining the former and shoe sole in operative contact with the same amount of force throughout the laying or leveling operation, such force may, by the present invention, be so controlled as to render it more efficient at one part of the shoe sole than at another, or be distributed equally over the shoe sole.

One mechanical embodiment of the invention to secure the above ends will now be described, it being understood that the invention is generic in this respect and not restricted to the particular means to be described.

The jack or shoe support herein shown is of the general character of that set forth in my Patent No. 958,278, dated May 17, 1910, and need not therefore be here described in detail. It consists essentially of a cradle 97 carrying the saddle 98, the last pin 99 pivoted to the upright 100, the toe rest 101, the jacking or locking lever 102, the sizing lever 103, the hold-down 104 and the other associated elements and parts, all as pointed out in my said patent, whereby the jack may be adjusted to treat different sizes of shoes, and the lasted shoe be properly supported and locked in jacked position. The drawings herein do not show the various details of the jack, as these are unessential to the true character of the invention and may be as fully shown and described in the above patent or that of Patent No. 958,301, dated May 17, 1910. Means are also shown herein for moving the saddle 98 rearward and for jacking the shoe by manipulation of the treadle 49, substantially as pointed out in the patent of Erastus Woodward, No. 958,057, dated May 17, 1910, such means in the present form of invention comprising the two arms 105 and 106, pivoted respectively at 107 and 108 to the table 66, the arm 105 being connected to the arm 106 by a spring 109, a link 110 pivoted to the arm 106 having a bifurcated end 112 engaging a pin 113, on the arm 105, whereby said arms may be swung on their pivots 107 and 108 by means of a rod 114, Figs. 2 and 4, connected to the treadle 49, and the arm 106 may continue to move to a limited extent after the arm 105 has been brought to rest by completing the rearward movement of the saddle 98, the continued movement of the arm 106 serving to throw the jacking lever 102 to lock the shoe in jacked position.

The cradle 97 which carries the shoe supporting elements is itself supported by the carrier 90 in a manner to provide for shifting the supports of the cradle laterally relative to the direction of the application of pressure by the former, such lateral shifting of the line of support being accomplished without tilting or swinging the cradle, and being susceptible of control so that equal pressures may be applied to the sole at each side of its center at any point in its length or such pressure may be caused to act more efficiently on one side than on the other side. As one means for carrying this feature of the invention into effect, each of the supporting arms 115 of the cradle 97 is provided with a head 116, which rests upon a slide 117, Figs. 7 and 7ª, which is mounted to move transversely of the carrier 90, and which may be pivotally connected to another slide 118, as at 119, said slide 118 being also mounted on the carrier 90 to move transversely. The slide 118 is preferably supported on a track 120, formed as part of the carrier 90, and to secure ease of movement transversely anti-friction devices 121 may be interposed between the slide 118 and track 120; and similar anti-friction devices 122 are or may be interposed between the head 116 and the slide 117.

In order that the cradle 97 may be held from bodily movement transversely of the carrier 90 when its supports are thus moved, a plate 123 secured to the carrier 90 is provided with a projection 124 which engages a suitable recess 125 formed in the head 116, all substantially as pointed out in Patent No. 958,301 to which reference has been made, and since the transverse sliding feature of the cradle is therein fully set forth further amplification here is unnecessary.

From the above it will be clear that any pressure applied to a shoe sole supported on the jack or shoe support will be transmitted through the heads 116, 116, (the cradle supports being the same at each end), to the carrier 90 through the pins or trunnions 119, and that the line connecting these pins or trunnions constitutes the line of support for the jack. This line of support is preferably, though not necessarily, in the general horizontal plane of the last bottom, so that the support for the last is substantially in the plane thereof. The shifting of this line of support laterally is herein accomplished by shifting the slides 118 relative to both the carrier 90 and cradle 97, thus carrying the terminals of the line of support or pins 119 to one side or the other of the central line along which the pressure is applied. To this end there is pivotally mounted at each end of the carrier 90 at 126 a lever 127, the upper end of which works in a recess 128 formed in the slides 118. If now the lower end of these levers be moved transversely as the shoe support travels longitudinally during the progressive action of the former it will be apparent that the line of support $a$—$b$, Fig. 6, will be shifted, as for instance to the positions $e$—$f$, $g$—$h$, etc., according to the character of the moving element; and if such shifting element be devised to shift the line of support so as to keep the center of pressure centrally of the shoe sole at all points of its length, as for instance when the former is acting at a transverse portion indicated by the line $a'$—$b'$, and $a^3$—$b^3$ etc., Fig. 6, the line of support be shifted from $a$—$b$ to $g$—$h$ and $e$—$f$ respectively, the opposite edge portions of the shoe sole will be subjected to equal actions or pressures.

If, however, the moving or shifting element be devised to shift the line of support so that it will not pass through the center of the shoe sole as the former and sole relatively progress from heel to toe or the reverse, then the greater laying and leveling action or pressure will be toward that edge nearest to the line of support. By properly devising the shifting element for the levers 127, therefore, any desired action or pressure may be exerted on different portions of the sole, as will be obvious.

In order to secure the desired results, as above outlined, the lower ends of the shifting levers 127 are to be controlled and moved by means of a cam channel or groove 129 formed in a cam plate 130, resting on suitable supports 130ˣ extending transversely of the table 66, see Figs. 8 and 9. The lower end 131 of the levers 127 engages a recess 132 in a slide 133 carried by the brackets 134 secured to the jack carrier 90. As one means of securing the slide 133 in place, and yet permit it to move transversely as called for by the cam channel or groove 129, a pin 135 extends downward through a slot 136 in the bracket 134, a roller 137 preferably surrounding the portion of the pin 135 contained within the slot 136 to thereby give ease of movement, Fig. 7. The pin 135 passes downward through the slide 133 and at its lower end carries a roller 138 adapted to engage the cam channel or groove 129 in the cam plate 130. Obviously, the means for thus moving the levers 127 may be duplicated, one being associated with each lever.

From the construction thus far described, it will be apparent that upon movement of the jack carrier 90 longitudinally of the table 66 under the influence of its actuator 92, that the lower ends of the levers 127 will be shifted transversely in accordance to the dictates of the cam channel or groove 129 in the cam plate 130. Assuming that it is desirable to subject the sole of a shoe to equal or like pressures on each side of its center from end to end thereof, and bearing in mind that the shoe has a swing, as indicated in Fig. 6, the cam channel or groove 129 in the cam plate will be so formed as to give lateral movement to the lower ends of the levers 127 and, consequently, the line of support at the upper end of said levers, in conformity with the shifting character of the line $c$, $d$, $b$, Fig. 6. If, on the other hand, it be desired to give the sole different laying and leveling or pressing treatments on opposite sides of said center line $c$, $d$, $b$, then the cam groove 129 will be correspondingly changed to secure the desired end, all as will be apparent to those skilled in the art.

In the construction thus far described, it has been assumed that the cam plate 130 remains stationarily supported on the table 66 as the jack or shoe support moves back and forth, in a manner to be hereinafter described, during the laying or leveling operation. As well known by those skilled in the art, however, it is desirable that the sole edge be properly turned, laid or leveled, regardless of whether pressure is uniformly or unequally distributed toward one or the other side of the sole center. To this end, therefore, the cam plate 130 is provided with actuating devices for giving it lateral or sidewise vibrations on the table 66, in a manner which will now be described.

Having reference to Figs. 8 and 9, the cam plate 130 near its opposite ends is engaged by the arms 139 of the bell crank levers 140, said bell crank levers being respectively carried by pivot pins 141 carried by brackets 142 extending centrally across two side portions of the table 66, as indicated in Fig. 8. As one means of connecting the arms 139 of these bell cranks with the under side of the cam plate 130, said cam plate has fins or flanges 143 formed on its end portion in which is a block 144 to which is pivotally jointed the arms 139 of said bell cranks, said block being held to the fins or flanges by a pin 144$^x$. The other ends 145 of these bell cranks are connected by a link 146, so that said bell cranks may be moved in unison and consequently cause the cam plate 130 to vibrate uniformly transversely of the table 66 at each end thereof.

Pivotally jointed to a lug 147 projecting from the link 146 is a link 148, Fig. 7, the opposite end thereof being jointed at 149 to a vibratory arm 150 pivoted at 151 to an arm or projection 152 extending from the table 66, see Fig. 2. The lower end of the vibratory arm 150 is jointed at 153 to a rod 154, the opposite end whereof, at 155, Figs. 2, 4 and 5, carries a roller which engages a slot 156 in a link 157 carried by shafts 158 which serve as a fulcrum about which the link 157 may vibrate. The shafts 158 are suitably supported, as shown in Fig. 3, in suitable bearings 159 on the machine frame, and the link 157 is provided with a roller 160 which engages a cam groove 161 in a face cam 162 mounted on the main driving shaft 7 of the machine, see Fig. 2. The cam groove 161 is appropriately formed to impart to the link 157 a constant vibratory movement about its center or shaft 158. Obviously, if the roller 155 carried by the arm 154 is concentric with the shaft 158, no motion will be imparted to the rod 154, but should the roller 155 be raised in the slot 156 of the link, then the rod 154 will be moved back and forth, its amplitude of movement being defined by the distance of the roller 155 from the shaft 158 about which the link 157 vibrates. In order to permit the roller 155 carried by the arm 154 to be moved into concentric or axial relation with the shaft 158, the link 157 has the bracket arm 163 which, as indicated in Fig. 3, has a backward and forward bend, as will be understood.

The cam gear 58 is provided with a cam groove 164, Figs. 4 and 5, of appropriate contour to define the position of the roller 155 with respect to the axis or shaft 158 of the link 157 whereby to control the extent of vibratory movement imparted to the rod 154 and, through it, the transverse vibratory movement of the cam plate 130.

As well known by those familiar with laying and leveling operations, it is desirable that the action along the edge portion of the sole shall vary at different longitudinal points thereof. For instance, the turning or leveling action of the sole edge along the edge of the shank should be considerable, such action gradually decreasing along the incline leading to the break of the ball where it is least and then gradually increasing to the toe. This characteristic action is graphically represented by the lines $k$, $k'$, $l$, $l'$, Fig. 6, said lines being represented in the shank portions of the shoe as widely separated, indicating thereby the extreme energetic action of the edge turning, laying or leveling operations along this portion of the sole. As these lines approach the break of the ball, they graphically represent the decrease in the edge turning or laying action and, by their subsequent divergence, indicate the different degrees of edge turning or leveling action along the forepart of the sole to the toe.

With the above facts in mind, the cam groove 164 in the cam gear 58 is appropriately formed to control, through connected mechanism, the position of the roll 155 in the slot of the link 157, to thereby regulate the transverse vibrations and consequent energy of edge turning or leveling action along different portions of the shoe sole as is desired.

Pivoted to the machine frame at 165 is a lever 166 carrying a roller 167, Figs. 4 and 5, which engages the cam groove 164 hereinbefore referred to. The lower end of the lever 166 is bifurcated at 168 and receives within it the rounded end 169 of the arm 170 mounted on the shaft 171 and carried by brackets 40 and 40*. As shown in Fig. 3, the arm 170 is extended below the shaft 171 and then turned to the left as at 172, and is connected to an arm 173 loosely mounted on the shaft 171. Also loosely mounted on the shaft 171 is an arm 174 which is engaged, as shown in Figs. 4 and 5, by proper adjusting screws 175 carried by the arm 173. The arm 174 has connected thereto an arm 176 by means of a side extension 177, as indicated in Fig. 3, said arm 176 being loosely mounted on the shaft 171. Jointed to the end of the arm 176 is a link 178 connected at 179, Fig. 4, to another link 180, which at its upper end is connected to the rod 154 near the roller 155, the construction being such that upon movement of the lever 166 about its fulcrum 165, due to the shape of the cam path 164, the roller 155 carried by the rod 154 will be raised and lowered in the slot 156 of the link 157, thereby appropriately changing the amplitude of transverse vibrations imparted to the cam plate 130. The contour of the cam groove 164 is preferably so formed as to provide the actions hereinbefore indicated and represented graphically by the line $k$, $k'$, $l$, $l'$ on the shoe sole of Fig. 6, it being clearly evident that by variations in the character of the cam groove 164 the energy of the laying or leveling action along the respective edges of the sole may be varied as desired.

As will be evident from the character of the machine thus far described, the laying or leveling action or pressure on the shoe sole is secured by a former which progressively acts longitudinally of the sole of a shoe carried by the shoe support or jack, and it will also be evident that the present invention aims to maintain a non-variable or constant pressure between the former and shoe sole as the laying or leveling action progresses along the sole. At the break of the ball or near the ball line the energy of action suitable to the remaining parts of the shoe sole is liable to be too great. To avoid this difficulty the rate of progression or speed of the former and shoe sole at this point is increased, so as to cause the former to pass more rapidly over the shoe sole at this point than at other parts of the sole. This variable speed may be secured by any suitable means, as for instance by making the cam 95, Fig. 2, of suitable contour, as shown, so that it shall cause the actuator 92 to impart to the jack carrier 90, and, through suitable connections, to be described, to the former, the desired rate of movement.

Near the upper portion of the machine frame are the supporting arms 181 affording suitable supports for a shaft 182, Figs. 1 and 2, carrying fast and loose pulleys 183 and 184, respectively, a belt shipper 185, Fig. 1, serving to direct a suitable driving belt to one or the other of said pulleys as desired. Secured to the shaft 182 are the gears 185 and 186, adapted to engage suitable gears 187 and 188, respectively, loosely mounted upon the former carrier shafts 189, a stationary bushing 190, Fig. 12, being preferably interposed between the shaft 189 and the gears 187, 188. Since the laying and leveling devices are duplicated in a twin machine, such as shown, it will be necessary to merely describe one of them.

The carrier shaft 189 is sustained in suitable hangers 191 projecting from the upper cross beam 2 and at the end thereof opposite the gear 188, for instance, has fixed thereto a segment 192 which is engaged by a gear 193 rigid with or secured to a sleeve 194 surrounding the tie rod 5. Said sleeve 194 has a pinion 195, Figs. 1 and 9, which is engaged by a rack 196 projecting along the side of the jack carrier 90, said pinion having its teeth suitably extended vertically to remain in engagement with the rack 196 as the table 66 rises and falls, as will be understood.

The above construction is such that as the jack carrier 90 is moved backward or forward by its actuator 92 as described, the sleeve 194 will be correspondingly rotated, and through the gear 193 impart oscillatory movement to the former carrier longitudinally and progressively over the sole of a shoe supported and moved backward and forward by the jack or shoe support.

The former carrier and former may be of any desired character, such for instance as set forth in patent to Erastus Woodward, No. 958,057, already referred to, but in the present form of the invention the former carrier comprises a block 197 loosely supported on the axial center of the shaft 189 by means of a hub 198, Figs. 11 and 12, said hub preferably surrounding the stationary sleeve 190, as shown. The block 197 supports a segment piece 199 connected to the block, as by the groove 200 and tongue 201, a pin 202 engaging a slot 203 in the block serving to limit the relative movement of the segment piece 199 and block. The segment piece preferably has a centering recess 204 to receive a centering lug 205 on the back of the former 206.

As indicated in the drawings, Figs. 10, 11 and 12, the former is provided with a patterned face substantially complemental to the longitudinal surface of a shoe sole, and is detachably connected to the segment piece. Such detachable connection is formed by means of a seat 207 and a latch 208 on opposite sides of the segment piece which engage suitable lugs 209 and 210 on corresponding sides of the former 206, Figs. 10 and 11.

The former 206, near the heel and toe portions, has backwardly projecting catch arms 211 and 212 adapted to be engaged at certain times with coöperating catch fingers 213 and 214, Fig. 12, in order to lock or unlock the former with relation to the former carrier 197 in a manner now to be described.

The catch finger 213 is secured to a shaft 215, Fig. 10, mounted in the former carrier and is provided with an operating arm or finger 216, Figs. 10 and 13, and a projecting lug 217, said lug being connected to a spring 218 acting to normally move the catch finger 213 into engagement with the catch arm 211. The catch finger 214, Fig. 12, is also secured to a shaft 219 mounted in the former carrier and is provided with an operating arm or finger 220 and a lug 221, the said lug being engaged by a spring 222 acting normally to move the catch finger 214 into engagement with the catch arm 212 carried by the former.

One of the hangers 191 is provided with two cam surfaces, Figs. 10 and 14, which co-act with the ends of the fingers 216 and 220, respectively, in a manner such that when the former carrier is in the position indicated in Figs. 1, 10, 11 and 12, both of the catch fingers 213 and 214 are disengaged from the catch arms 211 and 212 of the former, so that the latter may be readily applied to or taken from the carrier by simply operating the catch 208, as will be obvious to one familiar with this class of devices. Said fingers are also operated to unlock their respective ends of the former to permit the latter to adapt itself to the work to be done and then lock their respective ends to cause the leveling action of the former to be properly applied to the different parts of the shoe sole. To effect this locking and unlocking of the catch fingers, the hanger 191, Figs. 10 and 14, is provided with two cam surfaces or paths 223 and 224, which co-act with the fingers 216 and 220, respectively, so that when the former is turned up as in Fig. 10, the ends of the fingers 216 and 220 will rest upon a high portion of its cam surface, as indicated, but as the former is turned downward and into contact with the shoe at the heel portion, the finger 216 rides on a low part of its cam 223, causing the catch finger 213 to engage and interlock with the catch arm 211, so that at this point along the heel portion of the sole, if the former carrier is vibrated, as will presently appear, the former will also be vibrated. At this time the finger 220 still rides on a high portion of its cam, as indicated, Fig. 10, thus holding its catch finger 214 out of engagement with the catch arm 212 and, consequently, the toe portion of the former unlocked. As the former continues to turn onto the shank portion of the shoe, the end of the finger 216 moves onto the high portion 225 of its cam 223 thus unlocking its catch finger from the catch arm 211, and it remains in such unlocked condition as the former progresses toward the forepart and toe and over the ball.

As the former passes onto the shank, as above stated, the toe catch finger 214 remains unlocked by the end of the finger 220 riding over the high part 226 of its cam 224, but as the former passes from the shank and approaches the toe, the end of finger 220 passes onto the low part of its cam 224, as at 227, Fig. 10, thus locking the catch finger 214 and catch arm 212. As means for adjusting or regulating the movement of the former 206, an adjusting screw 228 is tapped into one end of the former carrier 197, as shown, to engage the end portion of the former 206 when the latter has been tilted or swung on its supports to the desired limit.

As hereinbefore indicated, it is desirable that the action of the former as it passes over the ball of the sole be quick or more rapid than over other portions of the sole in order to avoid improper treatment and consequent defects at this point. This rapid action has been described as due to the more rapid movement of the jack carrier as the former passes over the ball. This may be sufficient in cases to secure the desired result, but in the present embodiment of the invention the quick or rapid treatment at the ball of the sole is facilitated by the mounting of the former on the former carrier. As stated, the toe end of the former remains unlocked as the former passes up the incline at the shank leading to the ball line, and the distribution of pressure longitudinally of the former is such that as the former travels over the ball the former itself rocks longitudinally forward passing quickly over the ball onto the forepart at which time the toe portion of the former becomes locked.

From the construction of the laying and leveling device and the connections between the former and its carrier as above indicated, it will be apparent that as the jack carrier 90 is moved longitudinally of the table 66 to carry the jack and the shoe supported thereon backward and forward with relation to the former, that the former itself will be oscillated to adapt itself to the varying contour of the shoe sole at the various points of treatment.

It is sometimes desirable, however, that during the progressive action of the former and shoe sole longitudinally that the latter shall be subjected to a rubbing or attritive action to polish and properly level the shoe sole. In order that the former may be thus vibrated in a longitudinal direction during such progressing action of the former and shoe sole there is rotatably mounted in the former carrier a shaft 229 carrying a pinion 230, Figs. 2 and 13, which intermeshes with a pinion 231 secured to or formed as part of the gear 188, Fig. 13, whereby upon rotation of the shaft 182, as hereinbefore indicated, rotative motion will be imparted to the shaft 229 through the gearing connection described. On the back of the segment gear 192 is a lug 232 having a guide recess or way 233, Figs. 11 and 13, and in said recess or way there slides a block 234 which is engaged by an eccentric or crank pin 235 carried by the end of the shaft 229. From this construction it follows that as the segment 192 is turned by the gear 193 it will carry the former carrier to and out of operative position, the pinion 230 at such times passing about the pinion 231, Fig. 13. If now the shaft 182 be actuated to thereby rotate the pinion 230 through its operative connections therewith, it is evident that the former carrier 197 and the former 206 carried thereby will be vibrated due to the crank connection 235 between the carrier and segment 192. The amount of this vibration, which is in a direction longitudinal of the shoe sole, will depend, of course, upon the eccentricity of the eccentric or pin 235. If such vibration of the former and its carrier is not desired, it is simply necessary to throw the belt, which actuates the shaft 182, from the fast to the loose pulley, whereupon the former carrier and its former will cease to vibrate and will be moved as before progressively over the shoe sole.

Hereinbefore it has been stated that the shoe support or jack might be moved rearwardly and the shoe jacked thereon automatically upon depression of the treadle 49 in starting the machine. This characteristic and automatic action may or may not be employed; indeed, under some conditions, it is preferable to move the shoe support rearwardly by hand and by hand also to jack and lock the shoe in its jacked position. In either event, however, it is desirable that as the shoe support or jack comes forward after the laying or leveling operation that the shoe shall be automatically unjacked to enable it to be readily removed. In order to accomplish this unjacking and unlocking action, there is mounted on the table 66 at one side thereof a small bracket 236, Figs. 7 and 8, carrying a pin 237 on which is mounted a trip finger 238 normally held in the position indicated in Fig. 9 by a spring 239, one end of which is secured at 240 to the bracket 236, and the other end whereof is connected to tail-piece 241 projecting from the finger 238 in the manner clearly indicated in Fig. 9, a stop 242 carried by the finger 238 preventing further turning movement of said trip finger 238 by engagement with a projecting portion of the bracket 236, as indicated by dotted lines in Fig. 9. The position of the trip finger 238 is normally in the path of movement of the end 243 of the locking lever 102, Fig. 7. Consequently, when the jack is moved rearwardly and the shoe is jacked or locked in position by the jacking lever 102, the end 243 of the jacking lever will pass by the end of the trip finger 238, the latter yielding to permit such movement. When, however, at the conclusion of the laying or leveling operation the jack or shoe support is moved forward for removal of the shoe, the end 243 of the jacking lever will strike the trip finger 238 and, it being held from turning movement by the stop 242, will turn the jacking lever into position indicated in Fig. 7, thereby causing the shoe to be unlocked or unjacked, all of which will be readily understood by those skilled in the art.

When a shoe support or jack has been moved in its outward position for removal of a shoe and to receive another, it is desirable that it be held or locked in its central position and be not permitted to swing or tilt on its supports. To this end, there is pivotally supported upon the jack carrier 90, Figs. 7 and 9, a locking device which, when the jack or shoe support is in its outward position, or position of presentation, will engage the shoe support or jack and hold it in central position for the ready removal and placement of the work, and when the jack is moved into its laying or leveling position, said locking device will be automatically unlocked to free the shoe support or jack. The form of such locking device as indicated by the drawings, Figs. 7 and 9, consists of a pin 244 carried by the jack carrier 90 and on which is mounted a lever, one end 245 of which projects forward, as indicated, and is adapted to engage between the flanges 246 projecting from the lower portion of the saddle 97 when said saddle is in central position. The opposite end 247 of said lever has its arm bent as at 248 to engage an incline or cam 249 on the table 66, Figs. 7 and 9, so that as the jack carrier and jack or shoe support move inward, the end 248 of the locking device will ride up the incline or cam 249 on the bed 66 and throw the end 245 out of engagement with the saddle 97, a spring 250 acting normally to depress the end 248 and lift the end 245 of said lever into engagement with the flanges on the saddle when the jack is moved to its outward position.

As hereinbefore described, the cam 164 by its action on the lever 166 and its connected devices controls the position of the roller 155 in the slot 156 of the vibrating link 157, thereby determining the transverse vibrating movement of the line of support of the shoe during the progression of the former over the shoe sole. It is sometimes desirable that this transverse vibratory movement of the line of support be made effective in properly turning or leveling the edge of a shoe sole during the progression of the former over the shoe sole in one direction and that such vibratory action cease while the former travels in the reverse direction. This action has been found to be desirable in order to correct any inequality or irregularity in the leveling action which may have taken place upon the shoe sole or have caused it to become unduly arched. The cam 164 is, therefore, so formed, as shown in Fig. 4, that during the first contact between the former and shoe sole at the heel portion thereof, and during the forward progression of the former toward the toe of the shoe, it will impart to the line of support the desired vibratory movement transversely, but on the reverse movement of progression, that is, when the former goes back from the toe toward the heel of the shoe, such vibratory movement ceases by reason of the fact that the cam 164 moves the roller 155 into axial alinement with the shaft 158 about which the link 157 vibrates. While this change in vibratory movement of the line of support and former relative to each other is desirable it is to be understood that the invention is not restricted in this respect and that such vibratory movement may be carried into effect, if desired, both on the forward and backward progression of the former over the shoe sole.

As well known by those skilled in the art, one of the most important portions of a shoe sole, with respect to the contour thereof furnished by the laying or leveling action, is that inclined portion extending from the shank toward the break of the ball or ball line. In view of this fact, the present invention contemplates giving to the shoe sole the final and finishing action at this part. This is accomplished by means of the actuator 92 imparting the desired movement to the jack carrier 90 through its actuating cam 95. The said cam 95 is therefore so constructed as to give to the jack carrier a rearward movement on the table 66 after the shoe sole and former have been brought into coöperative relation, thereby causing progressive action of the former over the shoe sole toward the toe and at a speed greater at the break of the ball, and then, to reverse the direction of movement of the jack carrier, progressing the former in the reverse direction over the sole at the shank and heel portions. The cam 95 then imparts an additional backward or rearward movement to the jack carrier 90 causing the former to progress over the shank portion of the shoe to the incline leading from the shank to the break of the ball at which point the jack and former separate directly, as will hereinafter appear.

As will be apparent to one familiar with this class of machines, some of the characteristic features thereof may be employed in different relations, and changes and variations may be made in the form or character of some of the parts, but such modified conditions would still be within the general scope of the invention as definitely pointed out in the claims.

In summary, the operation of the machine may be briefly set forth as follows: The parts being in position as indicated generally in Figs. 1 and 2, and a lasted shoe being properly placed upon the jack or shoe support with the last pin 99 extending into the last hole and the toe of the shoe resting on the toe support 101, said shoe support or jack is moved rearwardly or to the left, as in Figs. 1 and 7, bringing the heel portion or counter of the shoe against a heel or back gage as pointed out in the Patent No. 958,278, hereinbefore referred to. The jack lever 102 is then turned by hand, if desired, and the shoe and its last properly locked in place. If desired, the above action may be accomplished by means of the starting treadle 49 through the arms 105 and 106. The foot being placed upon the treadle 49 and the latter depressed causes the cam controller 36 to be moved and the clutch members 25 and 26 to be engaged, thereby giving rotative movement to the cam gear 58, as hereinbefore pointed out. This action of the cam gear 58 first causes a rearward sliding movement of the jack carrier 90 on its table 66 to bring the heel portion and shank of the shoe under the former 206 which is brought down through its segment gear and connections into position to be engaged by the heel and shank portion of the shoe. The cam 79 on the cam gear acting upon the end of the lever 76 then lifts the table 66 bringing the shoe sole and former into pressure contact and immediately thereafter the cam 164 lifts the roll 155 in the link 57 causing the line of support of the shoe and former to be relatively vibrated transversely. The cam 95 through its actuator 92 then moves the jack carrier and shoe support or jack rearwardly, or to the left, Fig. 1, causing progression of the former 206 over the shoe sole toward the break of the ball, said relative vibratory movement of the line of support and former continuing.

As the jack carrier 90 thus moves rearwardly and the line of support and former are thus relatively vibrated transversely, the cam groove or channel 129 in the cam plate 130 acting upon the rolls 138 carried by the levers 127 causes an additional relative movement between the line of support and former in accordance with the path defined by said cam channel 129, as hereinbefore fully described. As the former progresses toward the toe and over the break of the ball, the speed of progression is increased by giving to the actuator 92, through its cam 95, a quicker action, and after the break of the ball has been passed, the speed is again decreased and so continues until the toe is reached. During the progression of the former over the forepart and toward the toe, the actions of the cam channel 129 and the cam 164 continue jointly to laterally shift the relative position of the line of support and former for the purposes hereinbefore fully described. The actuator 92 then moves the jack carrier and jack in a forward direction, the cam 164 being preferably so formed that during the progression of the former from the toe toward the heel, the transverse vibratory relative movement of the line of support and former ceases. As the break of the ball is reached, the rate of progression of the former over the shoe sole is again increased to quickly pass the break of the ball and is then again decreased as the shank portion of the shoe is reached.

The actuator 92 continues to move the jack carrier 90 forwardly until the rear of the shank and heel portions of the shoe sole are treated, it being understood that the cam 129 on the cam plate 130 still maintains its lateral shifting action upon the line of support during this retreating action of the former. As hereinbefore indicated, this rearward movement of the former toward the heel portion of the shoe sole is liable to disturb the lines already established on the incline leading from the shank to the break of the ball, to obviate which and to impart a finishing action at this part of the shoe sole, the actuator 92 is caused to move the jack carrier 90 again in a rearward direction until the former progresses over the shank of the shoe sole onto the incline leading to the break of the ball. The table 66 with the jack carrier and jack then descend directly away from the former until entirely disengaged therefrom whereupon the actuator 92 moves the jack carrier 90 forwardly, such movement causing the end 243 of the jack lever 102 to engage the trip finger 238 and unjack the shoe, as hereinbefore fully set forth. Obviously, also, as the jack carrier 90 moves forward, as stated, the former 206 is turned into its up position, as indicated in Fig. 2, by reason of its segment gear 192 and actuating connections with the jack carrier 90.

As the jack is thus moved forward into position for taking off a shoe already treated and putting on another, the lock automatically engages between the flanges on the underside of the saddle, and locks the saddle in central position.

As hereinbefore indicated, the jack or shoe support may be provided with a hold down 104 for engaging the heel portion of a shoe and hold the same in place during the laying or leveling operation, said hold down being of the character both in construction and operation as first set forth in Patent No. 958,278, to which reference has been made. The details of this hold down need not therefore be herein fully discussed since they are clearly set forth in said patent.

The former 206 has a recess 250 formed at its heel end which, as the former and shoe support or jack are brought together, engages the said hold down 104 and forces the same downward upon the heel portion of the shoe, as will be evident. This recess 250 is appropriately formed in the face of the former so as to permit the latter to move onto the heel of the shoe, as clearly pointed out in the said patent. Thus, as the shoe support or jack and former are brought into pressure relation the latter causes the hold down 104 to be appropriately seated upon the heel portion of the shoe.

From the construction and operation of the machine herein described, it will be noted that the jack and form are first brought into position substantially vertical with relation to each other, and that the jack with the shoe supported thereon is then directly raised so as to bring the heel and shank of the shoe into pressure contact with the heel portion of the former. This action serves to impress the sole firmly upon the shoe and while in this position of pressure the line of support of the jack is moved laterally to and fro, or vibrated. It will likewise be observed that after the longitudinal progression of the former over the shoe sole longitudinally, it returns to the heel and shank portions where it is given a further longitudinal progressive action over the shank and heel of a shoe sole, and that at the end of this operation or longitudinal rocking that the jack drops directly away from the former. Obviously, this longitudinal rocking of the form over the heel and shank may be performed one or a number of times and it might also be performed at the toe, if desired, or at other portions of a shoe sole. It will also be evident to those skilled in the art that the mounting of the former on the former carrier facilitates quick and rapid passage of the former over the shoe at the ball.

What is claimed is:

1. In a sole laying or leveling machine, the combination of a jack for sustaining a shoe and a coöperating leveling or laying form, means for progressively moving the jack and form longitudinally to cause the form to travel longitudinally over the shoe sole, means for vibrating the form longitudinally as it travels over the shoe sole, means for maintaining the same lateral or transverse relation of the form and jack during such progressive movement, and means for varying the effective action of the form laterally of the shoe sole being treated while maintaining such lateral or transverse relation of the form and jack.

2. In a sole laying or leveling machine, the combination of a jack for sustaining a shoe, a coöperating laying or leveling form, means for causing the form to move progressively and longitudinally over the sole of the shoe being treated, said form and jack maintaining the same lateral or transverse relation during such progressive movement, means for vibrating the form longitudinally as it progresses over the shoe sole, and means for varying the effective action of the form at opposite sides of the shoe sole during such progressive movement and while the form and jack maintain the same lateral or transverse relation.

3. In a sole laying or leveling machine, the combination of a jack, a sole laying or leveling device, means sustaining one of said parts on a line of support, means for relatively progressing the jack and laying or leveling device longitudinally of a shoe mounted on said jack, and means for relatively shifting the line of support laterally with relation to the part sustained on said line of support to vary the effective leveling action on different portions of the shoe sole.

4. In a sole laying or leveling machine, the combination of a jack for sustaining a shoe, a coöperating laying or leveling form, means for causing the form to move progressively and longitudinally over the sole of the shoe being treated, said form and jack maintaining the same lateral or transverse relation during such progressive movement, a crank and its operating devices for vibrating the form longitudinally as it progresses over the shoe sole, means for maintaining a substantially uniform pressure of the form on the shoe sole, and means for varying the effective action of the form at opposite sides of the shoe sole during such progressive movement and while the form and jack maintain the same lateral or transverse relation.

5. In a machine of the character described, the combination of a jack, means for sustaining it on a line of support, sole laying or leveling means, means to cause relative approach of the jack and sole laying or leveling means, means to cause relative progression of the jack and sole laying or leveling means at varying speeds at different portions of the shoe sole as the laying or leveling means moves over the sole of a shoe supported by the jack, and means for longitudinally vibrating the laying or leveling means to produce attritive action on the shoe sole.

6. In a sole laying or leveling machine, the combination of means for sustaining a shoe on a line of support, sole laying or leveling means, means for progressing the leveling or laying means over the shoe sole at different speeds on different portions of the shoe sole, and means for causing the laying or leveling means to treat the shoe sole attritively as it progresses longitudinally.

7. In a sole laying or leveling machine, the combination of means for sustaining a shoe, sole laying or leveling means, mechanism for causing the laying or leveling means to treat the sole of a shoe progressively lengthwise thereof from the shank toward the toe and return, then further to treat the shank portion, and finally treat the sole at the forward part of the shank, and means for then separating the shoe support and laying or leveling means.

8. In a sole laying or leveling machine, the combination of shoe supporting means to sustain a shoe on a line of support, sole laying or leveling means, means to cause the laying or leveling means to treat the sole of a shoe progressively lengthwise thereof, and means to move the line of support laterally to and fro during such progressive movement in one direction and discontinue such lateral movement of the line of support during such progressive movement in the opposite direction.

9. In a sole laying and leveling machine, the combination of means for acting on the sole of a shoe for laying or leveling the same, a shoe support for sustaining a shoe in coöperating relation with said means, means for causing the laying or leveling action to progress longitudinally of the shoe sole and return and for increasing the speed of the laying or leveling operation at the ball, and means for separating the laying or leveling means and shoe support when said means is acting for final treatment of the sole at the shank.

10. In a sole laying or leveling machine, the combination of means for acting on the sole of a shoe for laying or leveling the same, a shoe support for sustaining a shoe in coöperative relation with said means, means for causing said laying or leveling means and shoe support to approach and separate, and means for causing the laying or leveling means to first press the sole at the heel and shank and then to progress longitudinally over the shoe sole toward the toe and return and again progress longitudinally over the shank and impart a final laying or leveling action to the sole on the shank, said laying or leveling means and shoe support being then separated.

11. In a sole laying or leveling machine, the combination of a jack, means for sustaining the jack on a line of support, sole laying or leveling means, means to relatively move the jack and laying or leveling means into a position of pressure with the lateral or transverse relative positions of the jack and form in substantially fixed relation, means for causing the laying or leveling means to act progressively and attritively over the shoe sole longitudinally thereof, and means for shifting the said line of support laterally during such progressive movement to vary the pressure of the laying or leveling means at different transverse portions of the shoe sole while the transverse relation of the laying or leveling means and jack remain unchanged.

12. In a sole laying or leveling machine, the combination of a jack, means for sustaining the jack on a line of support, sole laying or leveling means, means to relatively move the jack and laying or leveling means into a position of pressure with the lateral or transverse relative positions of the jack and form in substantially fixed relation, means for causing the laying or leveling means to act progressively over the shoe sole longitudinally thereof, and means for vibrating said line of support transversely while the laying and leveling means is acting on the shank of the shoe sole, and for vibrating said line of support a less amount as the laying or leveling means is acting on the ball of the sole to vary the effective action of the laying or leveling means at the shank and ball while the transverse relation of the laying or leveling means and jack remain unchanged.

13. In a sole laying or leveling machine, the combination of a jack for sustaining a shoe along a line of support, means for moving the jack from and toward the front of the machine, a sole laying or leveling former, crank means for longitudinally vibrating the former as it travels longitudinally, means for shifting the line of support as the jack is so moved to cause the pressure of the former to act with the desired energy at the edges of the shoe sole, and means for vibrating said shifting means.

14. In a sole laying or leveling machine, the combination of a table, a jack sustained on a line of support and slidable on said table, sole laying and leveling means, a crank and operative connections for vibrating the laying or leveling means longitudinally, means to bring the jack and sole laying or leveling means into a position of pressure, means to cause the laying or leveling means to act progressively over the sole of a shoe supported by the jack, and means for shifting the line of jack support laterally as the jack slides on said table.

15. In a sole laying or leveling machine, the combination of a jack, means for sustaining the jack on a line of support, sole laying or leveling means for acting on the sole of a shoe, means for causing the laying or leveling means to progress longitudinally of the shoe sole, means for relatively vibrating the sole laying or leveling means and shoe sustaining means in a direction longitudinally of the shoe sole during the progressive movement of the laying or leveling means thereover, and means for relatively shifting the line of support and jack laterally during such progressive movement.

16. In a sole laying or leveling machine, the combination of a shoe support, a sole laying or leveling former for acting upon the sole of a shoe sustained by said support, a carrier for said former, and means for locking and unlocking the end portions of the former with respect to the carrier during the laying or leveling operation.

17. In a sole laying or leveling machine, the combination of a shoe support, a sole laying or leveling former for acting upon the sole of a shoe sustained by said support, a former carrier, and means for permitting said former to tilt longitudinally with relation to the former carrier to facilitate quick action of the former over the ball of the shoe sole.

18. In a sole laying or leveling machine, the combination of a table, a jack slidably mounted with relation to said table, sole laying and leveling means, means to bring said laying or leveling means and the sole of a shoe supported by said jack in a position of pressure, means for relatively progressing the jack and laying or leveling means, and means acting to lock the jack when relative movement of the jack and laying or leveling means places the jack in a position of presentation.

19. In a sole laying or leveling machine, the combination of a jack for sustaining a shoe, a former having a surface in substantial conformation with the contour of the shoe sole, means for causing the former to move progressively over the shoe sole, means for vibrating the former longitudinally during such progressive movement to subject the sole to attritive action, and means under control of the operative for rendering said vibrating means operative or inoperative as desired.

20. In a laying or leveling machine, the combination of a shoe support, sustaining means for said shoe support, laying or leveling means, crank means for vibrating the laying or leveling means longitudinally, means for vibrating the sustaining means of the shoe support transversely of the shoe sole and relative to the laying or leveling means during the action of the laying and leveling means, and means for varying the extent of such vibrations transversely.

21. In a sole laying or leveling machine, the combination of a shoe support, sole laying or leveling means, a hold down to engage the heel portion of a shoe sustained by said support and means for causing the laying or leveling means to move the hold down into engagement with the shoe.

22. In a sole laying or leveling machine, the combination of a sole laying or leveling former, a shoe supporting jack sustained on a line of support, means for relatively moving the former and jack to place the heel and shank portions of the sole of a shoe supported by the jack into position of pressure, means for causing the former to act at different speeds and progressively to the toe of the sole and return to initial position of pressure, and then progressively act longitudinally again upon the heel and shank of the sole, and means to relatively shift the jack and line of support laterally during such progressive action.

23. In a sole laying or leveling machine, the combination of a sole laying or leveling former, a supporting jack sustained on a line of support, means for relatively moving the former and jack to place the heel and shank portions of the sole of a shoe supported by the jack into position of pressure, means to move the line of support of the jack laterally to and fro with relation to the former and the jack while the parts are in said position of pressure, and means for then causing the former to progressively treat the shoe sole longitudinally.

24. In a sole laying or leveling machine, the combination of a jack for sustaining a shoe, a sole laying or leveling former, means for causing the former and jack to approach each other to subject the heel and shank portions of a shoe supported by said jack to pressure, and means to cause the former to progressively act longitudinally upon the sole toward the toe and to give to the sole at different parts in its length longitudinal or leveling treatment additional to that received by it and other parts of the sole by said progressive action.

25. In a sole laying or leveling machine, the combination of a shoe support, a sole laying or leveling former for acting upon the sole of a shoe sustained by said support, means for causing said former to progressively treat the sole of a shoe at varying speeds at different parts thereof, and means for causing the former to rock longitudinally with relation to its carrier to facilitate quick action of the former over the ball of a shoe sole.

26. In a laying or leveling machine, the combination of a shoe support, a sole laying or leveling former, means for relatively progressing the former and sole of a shoe on said support, a former carrier, and means for vibrating the former on the carrier to produce attritive action on the shoe sole.

27. In a laying or leveling machine, the combination of a shoe support, a sole laying or leveling former, a former carrier, and a crank connection between the former and carrier for vibrating the former.

28. In a laying or leveling machine, the combination of a shoe supporting jack sustained on a line of support, an opposed former for acting on the sole of a shoe sustained by said support, a fixed axis about which said former turns as it progresses over the shoe sole, and crank means for vibrating the former longitudinally as it travels over the shoe sole.

29. In a sole laying or leveling machine, the combination of a shoe supporting jack, an opposed former for acting on the sole of a shoe sustained by said jack, a fixed axis about which the former turns as it progresses over the shoe sole on said support, and a crank shaft and gearing connections for vibrating the former as it turns about said axis.

30. In a laying or leveling machine, the combination of a shoe supporting jack, a laying or leveling former for acting on the sole of a shoe when supported by said jack, means for causing said former to, and means including a crank device for vibrating the former longitudinally as it so acts.

31. In a sole laying or leveling machine, the combination of a jack and a laying or leveling former, means for sustaining one of said parts along a line of support, means for relatively shifting the line of support laterally with respect to the part sustained on said line of support and with relation to the former for varying the effective action of the former on different transverse portions of the shoe sole, and means for progressing the former longitudinally over the shoe sole at different speeds.

32. In a sole laying or leveling machine, a shoe support, a laying or leveling device, means for sustaining one of said parts on a line of support, means for bringing said parts into a position of pressure, means for relatively progressing said parts longitudinally, and means for shifting said line of support laterally during said relative progression.

33. In a sole laying or leveling machine, the combination of a jack for supporting a shoe, a sole laying or leveling device to act upon the sole of a shoe sustained by said jack, means for sustaining one of said parts on a line of support, and means for shifting the line of support laterally with relation to the part sustained on said line of support to vary the effective action of the laying or leveling device on different portions of the shoe sole.

In testimony whereof, I have signed my name to this specification, in the presence of two subscribing witnesses.

THOMAS G. PLANT.

Witnesses:
IRVING U. TOWNSEND,
ROBERT H. KAMMLER.

Copies of this patent may be obtained for five cents each, by addressing the "Commissioner of Patents, Washington, D. C."